(12) United States Patent
Spalka et al.

(10) Patent No.: US 8,677,146 B2
(45) Date of Patent: Mar. 18, 2014

(54) COMPUTER IMPLEMENTED METHOD FOR SENDING A MESSAGE TO A RECIPIENT USER, RECEIVING A MESSAGE BY A RECIPIENT USER, A COMPUTER READABLE STORAGE MEDIUM AND A COMPUTER SYSTEM

(75) Inventors: Adrian Spalka, Koblenz (DE); Jan Lehnhardt, Koblenz (DE)

(73) Assignee: CompuGroup Medical AG, Koblenz (DE)

( * ) Notice: Subject to any disclaimer, the term of this patent is extended or adjusted under 35 U.S.C. 154(b) by 305 days.

(21) Appl. No.: 12/904,359

(22) Filed: Nov. 3, 2010

(65) Prior Publication Data

US 2011/0154044 A1  Jun. 23, 2011

(30) Foreign Application Priority Data

Dec. 18, 2009 (EP) .................................. 09179974
Mar. 11, 2010 (EP) .................................. 10156171
Jun. 29, 2010 (EP) .................................. 10167641
Aug. 18, 2010 (EP) .................................. 10173163

(51) Int. Cl.
*H04L 29/06* (2006.01)

(52) U.S. Cl.
USPC ........................................... 713/189; 380/44

(58) Field of Classification Search
USPC ................................................. 713/168, 176
See application file for complete search history.

(56) References Cited

U.S. PATENT DOCUMENTS

| | | | |
|---|---|---|---|
| 4,864,616 A | 9/1989 | Pond et al. | |
| 4,879,747 A | 11/1989 | Leighton et al. | |
| 5,210,795 A | 5/1993 | Lipner et al. | |
| 5,721,781 A | 2/1998 | Deo et al. | |
| 5,754,675 A | 5/1998 | Valadier | |
| 5,832,091 A | 11/1998 | Tomko et al. | |
| 6,031,910 A | 2/2000 | Deindl et al. | |
| 6,167,521 A | 12/2000 | Smith et al. | |
| 6,212,519 B1 | 4/2001 | Segal | |
| 6,230,269 B1 * | 5/2001 | Spies et al. ..................... | 713/182 |
| 6,299,062 B1 | 10/2001 | Hwang | |

(Continued)

FOREIGN PATENT DOCUMENTS

| | | |
|---|---|---|
| DE | 10134489 A1 | 1/2003 |
| DE | 10258769 | 6/2004 |

(Continued)

OTHER PUBLICATIONS

"Elliptic Curve Cryptography", Technical Guideline TR-01111; Apr. 17, 2009, XP55011255, version 1.11; retrieved from the Internet Nov. 4, 2011: <<https://www.bsi.bund.de/SharedDocs/Downloads/DE/BSI/Publikationen/TechnischeRich  tlinien/TR03111/BSI-TR-03111_pdf.pdf?_blo b=publicationFile>>, 33 pages.

(Continued)

*Primary Examiner* — Vu Le
*Assistant Examiner* — Tracy Mangialaschi

(57) ABSTRACT

The invention relates to a computer implemented method for sending a message to a recipient user, wherein a recipient asymmetric cryptographic key pair is associated with the recipient user, said key pair comprising a public recipient key and a private recipient key, the method comprising sending the message to said recipient user with the recipient address to which the message is sent comprising the public recipient key.

20 Claims, 5 Drawing Sheets

(56) References Cited

U.S. PATENT DOCUMENTS

Figure 1:
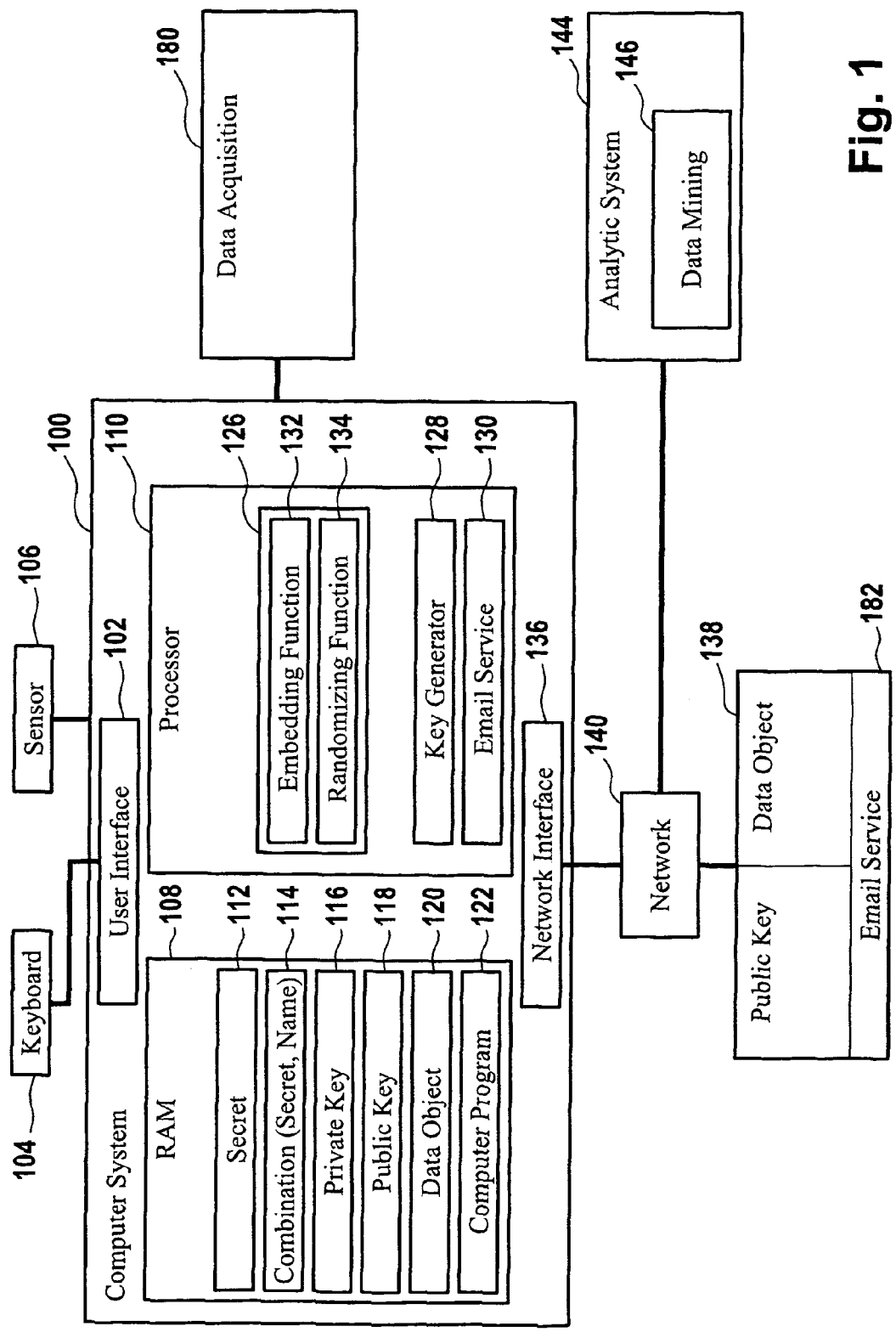

| | | |
|---|---|---|
| 6,523,116 B1 | 2/2003 | Berman |
| 6,529,886 B1 | 3/2003 | Campana |
| 6,532,472 B1 | 3/2003 | Arrouye et al. |
| 6,687,375 B1 * | 2/2004 | Matyas et al. .................. 380/45 |
| 6,754,655 B1 | 6/2004 | Segal |
| 6,904,150 B1 | 6/2005 | Dent |
| 6,950,523 B1 | 9/2005 | Brickell et al. |
| 6,959,381 B2 | 10/2005 | Wheeler et al. |
| 6,963,859 B2 | 11/2005 | Stefik et al. |
| 6,988,088 B1 | 1/2006 | Miikkulaninen et al. |
| 7,050,584 B1 | 5/2006 | Hoffmann et al. |
| 7,181,017 B1 | 2/2007 | Nagel et al. |
| 7,254,709 B1 * | 8/2007 | Richard ........................ 713/171 |
| 7,266,699 B2 | 9/2007 | Newman et al. |
| 7,393,532 B1 | 7/2008 | de Sauvage et al. |
| 7,502,469 B2 | 3/2009 | Antoine |
| 7,548,621 B1 | 6/2009 | Smith et al. |
| 7,590,236 B1 | 9/2009 | Boneh et al. |
| 7,634,091 B2 | 12/2009 | Zhou et al. |
| 7,643,817 B2 | 1/2010 | Klug et al. |
| 7,742,932 B2 | 6/2010 | Segal |
| 7,752,443 B2 | 7/2010 | Genty et al. |
| 7,844,717 B2 | 11/2010 | Herz et al. |
| 7,894,448 B1 | 2/2011 | Lillibridge et al. |
| 7,895,666 B1 | 2/2011 | Eshghi et al. |
| 7,952,443 B2 | 5/2011 | Chang et al. |
| 7,958,362 B2 | 6/2011 | Hwang |
| 7,962,761 B1 | 6/2011 | Spalka et al. |
| 8,024,581 B2 | 9/2011 | Spalka et al. |
| 8,137,922 B2 | 3/2012 | Dieplinger et al. |
| 8,145,718 B1 | 3/2012 | Kacker et al. |
| 8,224,979 B2 | 7/2012 | Herz et al. |
| 8,266,435 B2 | 9/2012 | Spalka et al. |
| 8,516,267 B2 | 8/2013 | Spalka et al. |
| 8,522,011 B2 | 8/2013 | Spalka et al. |
| 2001/0039503 A1 | 11/2001 | Chan et al. |
| 2002/0002061 A1 | 1/2002 | Miyasaka |
| 2002/0004899 A1 | 1/2002 | Azuma |
| 2002/0010679 A1 | 1/2002 | Felsher |
| 2002/0021810 A1 | 2/2002 | Solinas |
| 2002/0025045 A1 | 2/2002 | Raike |
| 2002/0091687 A1 | 7/2002 | Eglington |
| 2002/0103765 A1 | 8/2002 | Ohmori |
| 2002/0133707 A1 | 9/2002 | Newcombe |
| 2002/0184224 A1 | 12/2002 | Haff et al. |
| 2003/0046560 A1 | 3/2003 | Inomata et al. |
| 2003/0065776 A1 | 4/2003 | Malik et al. |
| 2003/0115457 A1 | 6/2003 | Wildish et al. |
| 2003/0118200 A1 | 6/2003 | Beaucoup et al. |
| 2003/0149854 A1 | 8/2003 | Yoshino et al. |
| 2003/0160815 A1 | 8/2003 | Mushetto |
| 2003/0190046 A1 | 10/2003 | Kamerman et al. |
| 2004/0025036 A1 | 2/2004 | Balard et al. |
| 2004/0059925 A1 | 3/2004 | Benhammou et al. |
| 2004/0083182 A1 | 4/2004 | Moribatake et al. |
| 2004/0109567 A1 | 6/2004 | Yang et al. |
| 2004/0181679 A1 | 9/2004 | Dettinger et al. |
| 2004/0199764 A1 | 10/2004 | Koechling et al. |
| 2005/0091341 A1 | 4/2005 | Knight et al. |
| 2005/0138353 A1 * | 6/2005 | Spies et al. .................. 713/153 |
| 2005/0157880 A1 | 7/2005 | Kurn et al. |
| 2005/0163320 A1 | 7/2005 | Brown et al. |
| 2005/0163549 A1 | 7/2005 | Shima et al. |
| 2005/0238175 A1 | 10/2005 | Plotkin et al. |
| 2005/0273604 A1 | 12/2005 | Lai |
| 2005/0283608 A1 | 12/2005 | Halcrow et al. |
| 2006/0031301 A1 | 2/2006 | Herz et al. |
| 2006/0034456 A1 | 2/2006 | McGough |
| 2006/0095771 A1 | 5/2006 | Appenzeller et al. |
| 2006/0106805 A1 | 5/2006 | Aaron |
| 2006/0153364 A1 | 7/2006 | Beeson |
| 2006/0153368 A1 * | 7/2006 | Beeson ........................ 380/30 |
| 2006/0153370 A1 | 7/2006 | Beeson |
| 2006/0277413 A1 | 12/2006 | Drews |
| 2007/0028108 A1 | 2/2007 | Cowburn et al. |
| 2007/0089168 A1 | 4/2007 | Wang et al. |
| 2007/0112782 A1 | 5/2007 | Lobach et al. |
| 2007/0118891 A1 | 5/2007 | Buer |
| 2007/0165864 A1 | 7/2007 | Nagase et al. |
| 2007/0198848 A1 | 8/2007 | Bjorn |
| 2007/0206789 A1 | 9/2007 | Sotoodeh |
| 2007/0208800 A1 | 9/2007 | Frohlich et al. |
| 2007/0273518 A1 | 11/2007 | Lupoli et al. |
| 2007/0294533 A1 | 12/2007 | Toh et al. |
| 2008/0005086 A1 | 1/2008 | Moore |
| 2008/0022361 A1 | 1/2008 | Bharadwaj et al. |
| 2008/0040603 A1 | 2/2008 | Stedron |
| 2008/0126794 A1 | 5/2008 | Wang et al. |
| 2008/0148047 A1 | 6/2008 | Appenzeller et al. |
| 2008/0152146 A1 | 6/2008 | Conrado et al. |
| 2008/0154782 A1 | 6/2008 | Kang et al. |
| 2008/0183656 A1 | 7/2008 | Perng et al. |
| 2008/0247540 A1 | 10/2008 | Ahn et al. |
| 2008/0250253 A1 | 10/2008 | Beckwith et al. |
| 2008/0263050 A1 | 10/2008 | Randazzo et al. |
| 2008/0267394 A1 | 10/2008 | Nan et al. |
| 2008/0270579 A1 | 10/2008 | Herz et al. |
| 2008/0301459 A1 | 12/2008 | Ebeid |
| 2009/0006860 A1 | 1/2009 | Ross |
| 2009/0041249 A1 | 2/2009 | Tanaka et al. |
| 2009/0129600 A1 | 5/2009 | Brickell et al. |
| 2009/0138727 A1 | 5/2009 | Campello de Souza |
| 2009/0158035 A1 | 6/2009 | Stultz |
| 2009/0187419 A1 | 7/2009 | Renganathan et al. |
| 2009/0187757 A1 | 7/2009 | Kerschbaum |
| 2009/0193250 A1 | 7/2009 | Yokota et al. |
| 2009/0205026 A1 | 8/2009 | Haff et al. |
| 2009/0210724 A1 | 8/2009 | Hori |
| 2009/0240941 A1 | 9/2009 | Lee et al. |
| 2009/0245515 A1 | 10/2009 | Bond et al. |
| 2009/0287837 A1 | 11/2009 | Felsher |
| 2009/0293116 A1 | 11/2009 | Demello et al. |
| 2010/0011410 A1 | 1/2010 | Liu |
| 2010/0017593 A1 | 1/2010 | Putz |
| 2010/0031025 A1 | 2/2010 | Zhang et al. |
| 2010/0088320 A1 | 4/2010 | Fortier et al. |
| 2010/0098256 A1 | 4/2010 | Kirshenbaum |
| 2010/0131296 A1 | 5/2010 | Knutson |
| 2010/0138655 A1 | 6/2010 | Matsui et al. |
| 2010/0191975 A1 | 7/2010 | Chase et al. |
| 2010/0208895 A1 | 8/2010 | Boneh et al. |
| 2010/0250937 A1 | 9/2010 | Blomquist et al. |
| 2010/0280333 A1 | 11/2010 | Parshuram et al. |
| 2011/0072142 A1 | 3/2011 | Herz et al. |
| 2011/0123027 A1 | 5/2011 | Gotthardt |
| 2011/0150212 A1 | 6/2011 | Spalka et al. |
| 2011/0154044 A1 | 6/2011 | Spalka et al. |
| 2011/0173455 A1 | 7/2011 | Spalka et al. |
| 2011/0179286 A1 | 7/2011 | Spalka et al. |
| 2011/0185178 A1 | 7/2011 | Gotthardt |
| 2011/0185188 A1 | 7/2011 | Spalka et al. |
| 2011/0191590 A1 | 8/2011 | Darbellay et al. |
| 2011/0225114 A1 | 9/2011 | Gotthardt |
| 2011/0268269 A1 | 11/2011 | Spalka et al. |
| 2011/0307961 A1 | 12/2011 | de Perthuis |
| 2012/0063592 A1 | 3/2012 | Spalka et al. |
| 2012/0063594 A1 | 3/2012 | Spalka et al. |
| 2012/0087494 A1 | 4/2012 | Spalka et al. |
| 2013/0179176 A1 | 7/2013 | Gotthardt |

FOREIGN PATENT DOCUMENTS

| | | |
|---|---|---|
| DE | 102004044892 A1 | 3/2006 |
| DE | 102004051296 B3 | 5/2006 |
| DE | 102004063962 A1 | 6/2006 |
| DE | 102006057201 A1 | 6/2008 |
| EP | 0334616 A2 | 9/1989 |
| EP | 1411514 A2 | 4/2004 |
| EP | 1657847 A1 | 5/2006 |
| EP | 1890270 A1 | 2/2008 |
| WO | WO 99/14652 A1 | 3/1999 |
| WO | WO 99/33222 A1 | 7/1999 |
| WO | WO 00/41613 A2 | 7/2000 |
| WO | WO 00/54125 A1 | 9/2000 |

(56) References Cited

FOREIGN PATENT DOCUMENTS

| WO | WO 00/72504 A1 | 11/2000 |
| WO | WO 01/69513 A2 | 9/2001 |
| WO | WO 02/05061 A2 | 1/2002 |
| WO | WO 02/09580 A1 | 2/2002 |
| WO | WO 2007/031955 A2 | 3/2007 |
| WO | WO 2007/091002 A1 | 8/2007 |
| WO | WO 2008/059475 A1 | 5/2008 |
| WO | WO 2008/085881 A1 | 7/2008 |
| WO | WO 2009/121657 A1 | 10/2009 |

OTHER PUBLICATIONS

Arokiaraj, A. Rex Macedo et al., "ACS: An Efficient Address Based Cryptography Scheme for Mobile Ad Hoc Networks Security", IEEE International Conference on Computer and Communication Engineering, 2008, Piscataway, NJ, USA, May 13, 2008, pp. 52-56, XP031292749, ISBN: 978-1-4244-1691-2.

Atallah, Mikhail J., et al., "Dynamic and Efficient Key Management for Access Hierarchies," Proceedings of the 12th ACM Conference on Computer and Communications Security, Alexandria, VA, Nov. 7-11, 2005; 12 pages.

Benjumea et al., "Anonymous Attribute Certificates Based on Traceable Signatures," Internet Research, vol. 16, No. 2, Jan. 2006, pp. 120-139.

Bresson, Emmanuel et al., "Dynamic Group Diffie-Hellman Key Exchange under Standard Assumptions," IACR 2002, 16 pages.

Camenisch, J. et al., "How to Win the Clone Wars: Efficient Periodic n-Times Anonymous Authentication," CCS '06, Oct. 30-Nov. 3, 2006, Alexandria, VA; Copyright 2006 ACM; 1-59593-518-5/06/0010; pp. 201-210.

Chao, Gao, "Study on Privacy Protection and Anonymous Communication in Peer-to-Peer Networks", IEEE 2009 International Conference on Multimedia Information Networking and Security, Piscataway, NJ, USA, Nov. 18, 2009, pp. 522-525, XP031592182, ISBN: 978-0-7695-3843-3.

Chothia, Tom et al., "Securing Pseudo Identities in an Anonymous Peer-to-Peer File-Sharing Network," IEEE Third International Conference on Security and Privacy in Communications Networks and the Workshops, 2007, Piscataway, NJ, USA, Sep. 17, 2007, pp. 279-282, XP031276557, ISBN: 978-1-4244-0974-7.

Chung, Y.F., et al. "Access Control in User Hierarchy Based on Elliptic Curve Cryptosystem," Science Direct Information Sciences, Amsterdam, NL LNKD-DOI: 10.1016/J.INS.2007.08.001, Bd. 178, Nr. 1; Oct. 9, 2007, pp. 230-243, XP022289858 ISSN: 0020-0255.

Gudes, Ehud "The Design of a Cryptography Based Secure File System," IEEE Transactions on Software Engineering, vol. 6, No. 5, Sep. 1980, pp. 411-420, XP007912572.

Guinee, R. et al., "A Novel True Random Binary Sequence Generator Based on a Chaotic Double Scroll Oscillator Combination with a Pseudo Random Generator for Cryptographic Applications", 2009, IEEE Internet Technology and Secured Transactions, Nov. 9-12, 2009; ISBN: 978-1-4244-5647-5; 6 pages.

Hengartner, U. et al., "Exploiting Hierarchical Identity-Based Encryption for Access Control to Pervasive Computing Information," IEEE Proceedings of the First International Conference on Security and Privacy for Emerging Areas in Communications Networks, ISBN 0-7695-2369-2/05, 2005, 10 pages.

Hoffstein, et al., "An Introduction to Mathematical Cryptography," 2008 Spring Scient Busniess Media, LLC; ISBN 978-0-387-77993-5, pp. 60-61.

Jeng, Fuh-Gwo et al: "A practical and dynamic key management scheme for a user hierarchy", Journal of Zhejiang University Science A; An International Applied Physics & Engineering Journal, Springer, Berlin, DE, vol. 7, No. 3, Mar. 1, 2006, pp. 296-301, XP019360969, ISSN: 1862-1775, DOI: 10.1631/JZUS.2006.A0296.

Kuo, F.H. et al., "Cryptographic key assignment scheme for dynamic access control in a user hierarchy," IEEE Proceedings—Computers and Digital Techniques, vol. 146, No. 5, Sep. 1999, pp. 235-240, XP006013180 ISSN: 1350-2387.

Lin, Y. et al. "Digital Signature Systems Based on Smartcard and Fingerprint Feature," Journal of Systems Engineering and Electronics, vol. 18, No. 4, 2007, received Aug. 10, 2006, pp. 825-834.

Menezes, A. et al., "Chapter 12: Key Establishment Protocols ED", Handbook of Applied Cryptography; [CRC Press Series on Discrete Mathematices and Its Applications], CRC Press, Boca Raton, FL, US, pp. 489-541, Oct. 1, 1996, XP001525012, ISBN: 978-0-8493-8523-0 Retrieved from the Internet: URL:http://www.cacr.math.uwaterloo.ca/hac/.

Menezes, A. et al., "Chapter 13: Key Management Techniques ED", Handbook of Applied Cryptography; [CRC Press Series on Discrete Mathematices and Its Applications], CRC Press, Boca Raton, FL, US, pp. 543-590, Oct. 1, 1996, XP001525013, ISBN: 978-0-8493-8523-0 Retrieved from the Internet: URL:http://www.cacr.math.uwaterloo.ca/hac/.

Menezes, A. et al., "Chapter 8: Public-Key Encryption ED", Handbook of Applied Cryptography; [CRC Press Series on Discrete Mathematices and Its Applications], CRC Press, Boca Raton, FL, US, pp. 283-319, Oct. 1, 1996, XP001525008, ISBN: 978-0-8493-8523-0 Retrieved from the Internet: URL:http://www.cacr.math.uwaterloo.ca/hac/.

Montenegro, G. et al., "Statistically Unique and Cryptographically Verifiable Identifiers and Addresses", 5. JCT-VC Meeting; 96. MPEG Meeting; Mar. 16, 2011-Mar. 23, 2011; Geneva;(Joint Collaborative Team on Video Coding of ISO/IEC JTC1/SC29/WG11AND ITU-T SG.16 ); URL: http://WFTP3.ITU.INT/AV-ARCH/JC TVC-SITE/—Mar. 17, 2011, Internet Engineering Task Force, IETF, Apr. 1, 2001, XP015032660, ISSN: 0000-0004, 13 pages.

Musen, M.A. et al., "Clinical Decision-Support Systems," from "Biomedical Informatics: Computer Applications in Health Care and Biomedicine," May 25, 2006, New York, NY, pp. 698-736.

Nadehara, K. et al. "Extended Instructions for the AES Cryptography and their Efficient Implementation", 2004, IEEE Workshop on Signal Processing Systems, Oct. 13-15, 2004; pp. 152-157.

Rankl, W. et al., "Smart Card Handbook, Third Edition" 1999, John Wiley & Sons, Ltd., ISBN: 0-470-85668-8, pp. 51,187-203, 222-244, 397-433, 441-442, 457-465.

Rare Diseases Act, Nov. 6, 2002, Public Law 107-280, 107th Congress, 5 pages.

Sandhu, R. S., "On Some Cryptographic Solutions for Access Control in a Tree Hierarchy," Proceedings 1987 Fall Joint Computer Conference on Exploring Technology: Today and Tomorrow; (Cat. No. 87CH2468-7) IEEE Computer Socienty, 1987, pp. 405-410, XP007912584 ISBN: 0-8186-0811-0.

Schneider, F.B. et al., "Implementing Trustworthy Services Using Replicated State Machines", IEEE Computer Society, IEEE Security & Privacy; vol. 3, issue 5; ISSN: 1540-7993/05; Sep.-Oct. 2005, pp. 34-43.

Shamir, A: "Identity-Based Cryptosystems and Signature Schemes," Lecture Notes in Computer Science/MICCAI 2000, Springer, DE; Jan. 1, 1985, pp. 47-53, XP000675444, DOI: 10.1007/3-540-39568-7_5 ISBN: 978-3-540-24128-7.

Zhang, Yang, "An Efficient Anonymous Authentication Protocol with Pseudonym Revocability", 2009 Fifth International Joint Conference on INC, IMS and IDC; IEEE Computer Society; Aug. 25, 2009, pp. 1929-1934, XP031564722, ISBN: 978-0-7695-3769-6.

Waters B R et. al, "Receiver anonymity via incomparable public keys" Proceedings of the 10th ACM Conference on Computer and Comunitcations Security, Washington D.C. vol Conf 10, Oct. 27, 2003, XP002361168, DOI:10.1145/948109.948127, ISBN 978-1-58113-738-5.

* cited by examiner

COMPUTER IMPLEMENTED METHOD FOR SENDING A MESSAGE TO A RECIPIENT USER, RECEIVING A MESSAGE BY A RECIPIENT USER, A COMPUTER READABLE STORAGE MEDIUM AND A COMPUTER SYSTEM

CLAIM FOR PRIORITY

This application claims the benefit of European Patent Applications No. 10 173 136.3, filed Aug. 18, 2010; No. 10 167 641.9, filed Jun. 29, 2010; No. 10 156 171.0, filed Mar. 11, 2010; and No. 09 179 974.2, Dec. 18, 2009, which are hereby incorporated herein.

FIELD OF THE INVENTION

The present invention relates to a computer implemented method of sending a message to a recipient user, a method for receiving a message by a recipient user, a computer readable storage medium and a computer system.

BACKGROUND OF THE INVENTION

Computer implemented communication relies on the transmission of messages from senders to recipients. Such communication may occur for example in IP based networks like the internet and mobile telecommunication networks and comprises without loss of generality email communication, instant messaging, voice chat, short message services (SMS) and telephone communications.

Many message transmissions are based on the principle that a recipient address is known to the sender, wherein the messages are sent to the recipient by specifying the recipient via said recipient address. However, this has the disadvantage that the recipients' identity may be officially available.

BRIEF SUMMARY OF THE INVENTION

The invention provides a computer implemented method for sending a message to a recipient user, wherein a recipient asymmetric cryptographic key pair is associated with the recipient user, said key pair comprising a public recipient key and a private recipient key, the method comprising sending the message to said recipient user with the recipient address to which the message is sent comprising the public recipient key.

Embodiments of the invention have the advantage, that a 'blind messaging' can be performed. Thus, the recipient's identity is not revealed when sending the message to the recipient user with the recipient address to which the message is sent comprising the public recipient key. Further, even though messages may be stored in a database associated with the public recipient key, it will not be possible to identify the respective 'real person' that is associated with said public recipient key even when having full access to said database.

In accordance with an embodiment of the invention, the recipient address corresponds to the public recipient key. However, the invention is not limited to this specification. For example, it may be possible to add a domain name to the public recipient key such to make such kind of messaging compatible to already existing internet messaging systems: the invention thus either permits to direct a message directly to the address 'public_recipient_key' or to direct the message to for example 'public_recipient_key@securedomain.com'.

In case of SMS messaging in mobile telecommunication networks, for example the message may be directed to a central provider telephone number, wherein the body of the SMS message may contain the public recipient key and the message 'message' like for example 'public_recipient_key message'.

The skilled person will understand that there are further possibilities to realize the basic idea according to the invention in various messaging environments.

In accordance with an embodiment of the invention, said message is sent encrypted with the public recipient key to the recipient user. Thus, the public recipient key has a double purpose: the first purpose is the usage as anonymous recipient address and the second purpose is the usage as encryption key. Since only the recipient possesses the private recipient key, only he will be able to decrypt the message. Thus, in a highly convenient manner, secure messaging can be performed in an anonymous manner, wherein only one type of information is required to be known by the sender: the public recipient key.

In accordance with an embodiment of the invention, said message is sent from a sender user, wherein a sender asymmetric cryptographic key pair is associated with the sender user, said key pair comprising a public sender key and a private sender key, the method further comprising generating a signature of the message using the private sender key and sending the signature to said recipient user. This further enables the recipient to verify the authenticity of the message in a very convenient manner. Preferably, the public sender key is available in a respective database such that it is possible to also verify that the sender of the message is an ordinary member of the group of participants which is allowed to send messages to the recipient.

In accordance with an embodiment of the invention, the message is a synchronous or asynchronous conferencing message. For example, synchronous conferencing may comprise any kind of data conferencing, instant messaging, Internet Relay Chat (IRC), videoconferencing, voice chat, or VoIP (voice over IP). Asynchronous conferencing may comprise email, Usenet, SMS or MMS.

In accordance with an embodiment of the invention, the message is an email message with the message being sent to the recipient user by email, wherein the email address comprises the public recipient key. For example, in this case the public recipient key is comprised in the header of the email as the recipient address to which the message is sent, wherein the message is comprised in the body of the email. Variations like having the public recipient key being comprised in the body with the message being sent to a central email service with central email address are also possible.

In another aspect, the invention relates to a computer implemented method for receiving a message by a recipient user, wherein a recipient asymmetric cryptographic key pair is associated with the recipient user, said key pair comprising a public recipient key and a private recipient key, the method comprising receiving the message by said recipient user with the recipient address at which the message is sent comprising the public recipient key.

In another aspect, the invention relates to a computer implemented method for generating a public key and a private key for being used in the methods as described above with a) the public key being the public recipient or the public sender key and b) the private key being the private recipient or the private sender key, the method comprising:
  entering a user-selected secret,
  storing the user-selected secret in a memory,
  computing the private key by applying an embedding and randomizing function onto the secret,
  storing the private key in the memory, computing the public key using the private key, the public key and the private key forming the asymmetric cryptographic key pair, erasing the secret and the private key from the memory, outputting the public key.

The term 'user-selected secret' is understood herein as any secret data that is selected by or related to a user, such as a user-selected secret password or a secret key, such as a symmetric cryptographic key. Further, the term 'user-selected secret' does also encompass a combination of biometric data obtained from the user and a user-selected password or secret key, such as a biometric hash value of the password or secret key.

The term 'memory' as used herein encompasses any volatile or non-volatile electronic memory component or a plurality of electronic memory components, such as a random access memory.

The term 'embedding function' or 'embedding component' as used herein encompasses any injective function that maps the elements of an n-dimensional space onto elements of an m-dimensional space, where n>m. For the purpose of this invention, we focus on embedding functions where m=1. In accordance with embodiments of this invention n is equal to 2 and m is equal to 1 for combining two elements onto a single element. In one embodiment, a user-selected secret and a public parameter are mapped by the embedding function to the 1-dimensional space to provide a combination of the user selected secret and a public parameter, e.g. a single number that embeds the user selected secret. This single number constitutes the embedded secret. In another embodiment, a first hash value of the user selected secret and a random number are mapped by the embedding function to the 1-dimensional space to provide the embedded secret.

A 'randomizing function' or 'randomizing component' as understood herein encompasses any injective function that provides an output of data values that are located within a predefined interval and wherein the distribution of the data values within the predefined interval is a substantially uniform distribution.

The term 'embedding and randomizing function' as used herein encompasses any function that implements both an embedding function and a randomizing function.

Even though, any known method for generation of asymmetric cryptographic keys may be employed in order to carry out the invention, the embodiment employing the user-selected secret for generating the public key and the private key is particularly advantageous as an extremely high degree of protection of the informational privacy of users is provided. This is due to the fact that an assignment of the user's identity to the user's public key does not need to be stored and that no third party is required for establishing a binding between the public key and the user's identity. In contrast, embodiments of the present invention enable to generate a user's public key in response to the user's entry of a user-selected secret whereby the public key is derived from the user-selected secret. As the user-selected secret is only known by the user and not stored on any computer system there is no way that a third party could break the informational privacy of the user, even if the computer system would be confiscated such as by a government authority.

This enables to store sensitive user data, such as medical data, even in an unencrypted form in a publicly accessible database. The user's public key can be used as a database access key, e.g. a primary key or candidate key value that uniquely identifies tuples in a database relation, for access to data objects stored in the database.

The for example medical data is received via the above mentioned messaging scheme, for example via a message hosting provider, thus significantly facilitating data communication and storage. In an embodiment, for medical data storage a user may enter his user-selected secret at a medical service provider who just recorded medical data on the user. One may imagine a visit of a patient at a medical laboratory which just acquired several medical results of the patient. Then the patient may enter his user-selected secret at the medical laboratory enabling to generate his public recipient key. Then, the medical results may be sent as a message for example by email to the address being said public recipient key or comprising said public recipient key for anonymous storage in a central database.

Consequently, only the patient himself will be able to retrieve his medical results since he or she is the only person who will be able to know which data stored in said central database belongs to him or her—by means of his user-selected secret from which his public key can be generated. Data retrieval may be performed by accessing the central database via an email client in which the users' public key is specified as his or her email address, wherein data retrieval may be performed by standard email services like POP3 or IMAP.

Further, for example, the central database with pseudonymous data can be used for a decision support system, e.g. in the medical field for evaluating a user's individual medical data and processing the data by rules. The result of the evaluation and processing by rules may be hints and recommendations to the physician regarding the user's health condition and further treatment. These results may be sent to the user via the anonymous messaging system.

It has to be noted here, that the invention is not limited to messages comprising medical data. Any kind of data may be comprised in the messages like video data, text data, image data or voice data of any technical field.

In accordance with an embodiment of the invention, the secret may comprise a user-selected password and/or a secret key and/or biometric data.

In accordance with an embodiment of the invention, at least one public parameter is used for applying the embedding and randomization function. A public parameter may be the name of the user, a further (state of the art) email address of the user or another identifier of the user that is publicly known or accessible. A combination of the user-selected secret and the public parameter is generated by the embedding component of the embedding and randomization function that is applied on the user-selected secret and the public parameter. However, it has to be noted that this can only be performed if the public parameter is not known as such to the 'public'; since the purpose of the invention is providing pseudonymousness, the additional parameter should not be stored publicly, or in case it is stored in public, it should not reveal anything about the identity of the user like his name etc.

The combination can be generated such as by concatenating the user-selected secret and the public parameter or by performing a bitwise XOR operation on the user-selected secret and the public parameter. This is particularly advantageous as two users may by chance select the same secret and still obtain different public keys as the combinations of the user-selected secrets with the user-specific public parameters differ.

In accordance with an embodiment of the invention, the embedding component of the embedding and randomizing function comprises a binary cantor pairing function. The user-selected secret and the public parameter are embedded by applying the binary cantor pairing function on them.

In accordance with an embodiment of the invention, the randomizing component of the embedding and randomizing function uses a symmetric cryptographic algorithm like the Advanced Encryption Standard (AES) or the Data Encryption Standard (DES) by means of a symmetric key. This can be performed by encrypting the output of the embedding component of the embedding and randomizing function, e.g. the binary cantor pairing function, using AES or DES.

In accordance with an embodiment of the invention, the symmetric key that is used for randomization by means of a symmetric cryptographic algorithm is user-specific. If the symmetric key is user-specific, the use of a public parameter can be skipped, as well as embedding the user-selected secret and the public parameter; the randomizing function can be applied then solely on the user-selected secret. By applying a symmetric cryptographic algorithm onto the user-selected secret using a user-specific symmetric key both embedding and randomization of the user-selected secret are accomplished. If the symmetric key is not user-specific, the use of the public parameter and embedding the user-selected secret and the public parameter are necessary.

In accordance with an embodiment of the invention, the embedding and randomizing function is implemented by performing the steps of applying a first one-way function on the user-selected secret to provide a first value, providing a random number, embedding the random number and the first value to provide a combination, and applying a second one-way function on the combination to provide a second value, wherein the second value constitutes the private key. This embodiment is particularly advantageous as it provides a computationally efficient method of implementing an embedding and randomization function.

In accordance with an embodiment of the invention, the computation of the public key is performed by elliptic curve cryptography (ECC). The private key that is output by the embedding and randomizing function is multiplied with a first base point given by the domain parameters of the elliptic curve to provide another point on the elliptic curve, which is the public key.

In accordance with an embodiment of the invention, it is determined whether the output of the embedding and randomizing function fulfils a given criterion. For example, it is checked whether the output of the embedding and randomization function is within the interval between 2 and n−1, where n is the order of the elliptic curve. If the output of the embedding and randomizing function does not fulfill this criterion another random number is generated and the embedding and randomization function is applied again to provide another output which is again checked against this criterion. This process is performed repeatedly until the embedding and randomizing function provides an output that fulfils the criterion. This output is then regarded as the private key that is used to calculate the public key, by multiplying the private key with the first base point.

In accordance with a further embodiment of the invention the base point is varied leaving the other domain parameters unchanged for computation of multiple public keys for a given user. This provides a computationally efficient way to compute multiple public keys for a given user in a secure way.

In another aspect, the invention relates to a computer program product comprising computer executable instructions to perform any of the method steps described above.

In another aspect, the invention relates to a computer system for sending a message to a recipient user, wherein a recipient asymmetric cryptographic key pair is associated with the recipient user, said key pair comprising a public recipient key and a private recipient key, the system comprising an interface for sending the message to said recipient user with the recipient address to which the message is sent comprising the public recipient key, the system further comprising means for sending the message, and means for receiving the public recipient key.

In another aspect, the invention relates to a computer system for generating a public key and a private key for being used in the method described above, the public key being the public recipient or the public sender key and the private key being the private recipient or the private sender key, the method comprising:
  means for entering a user-selected secret,
  memory means for storing the user-selected secret and the private key,
  processor means being operable to
    a) compute the private key by applying an embedding and randomizing function onto the secret,
    b) compute the public key using the private key, the public key and the private key forming an asymmetric cryptographic key pair,
    c) erase the secret and the private key from the memory,
    d) output the public key.

In another aspect, the invention relates to a computer system for receiving a message by a recipient user, wherein a recipient asymmetric cryptographic key pair is associated with the recipient user, said key pair comprising a public recipient key and a private recipient key, the system comprising an interface for receiving the message by said recipient user with the recipient address at which the message is received comprising the public recipient key, the system further comprising means for receiving the message and means for receiving the public recipient key.

BRIEF DESCRIPTIONS OF THE DRAWINGS

Figure 2:
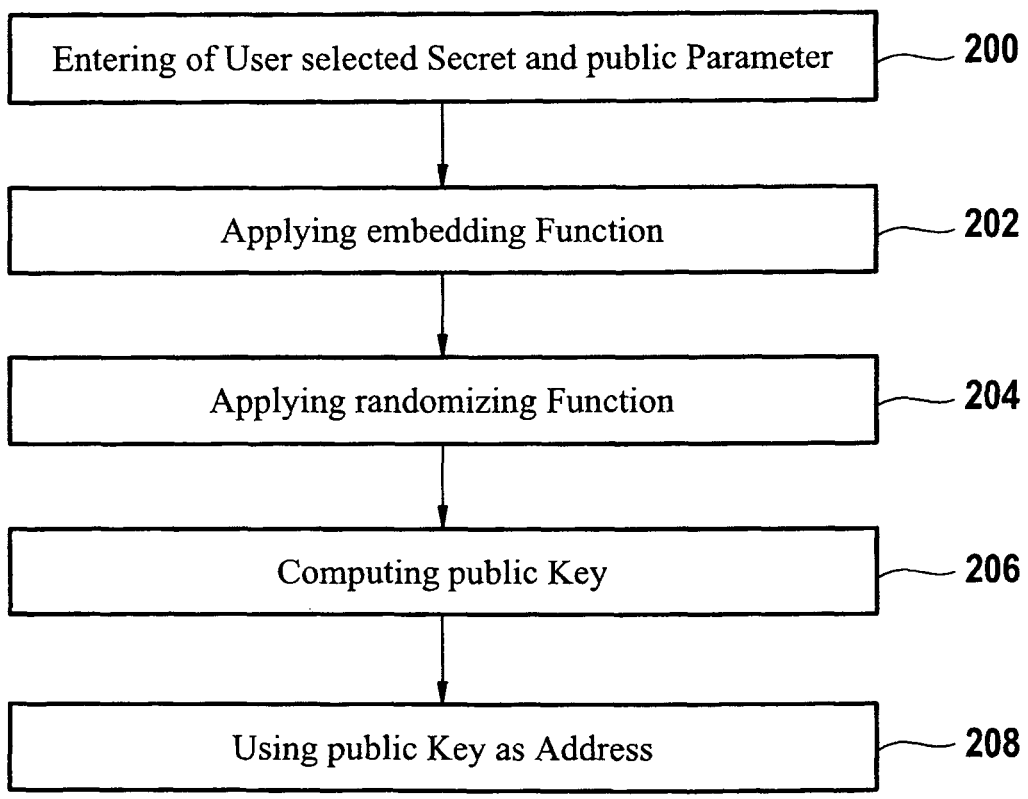
Figure 3:
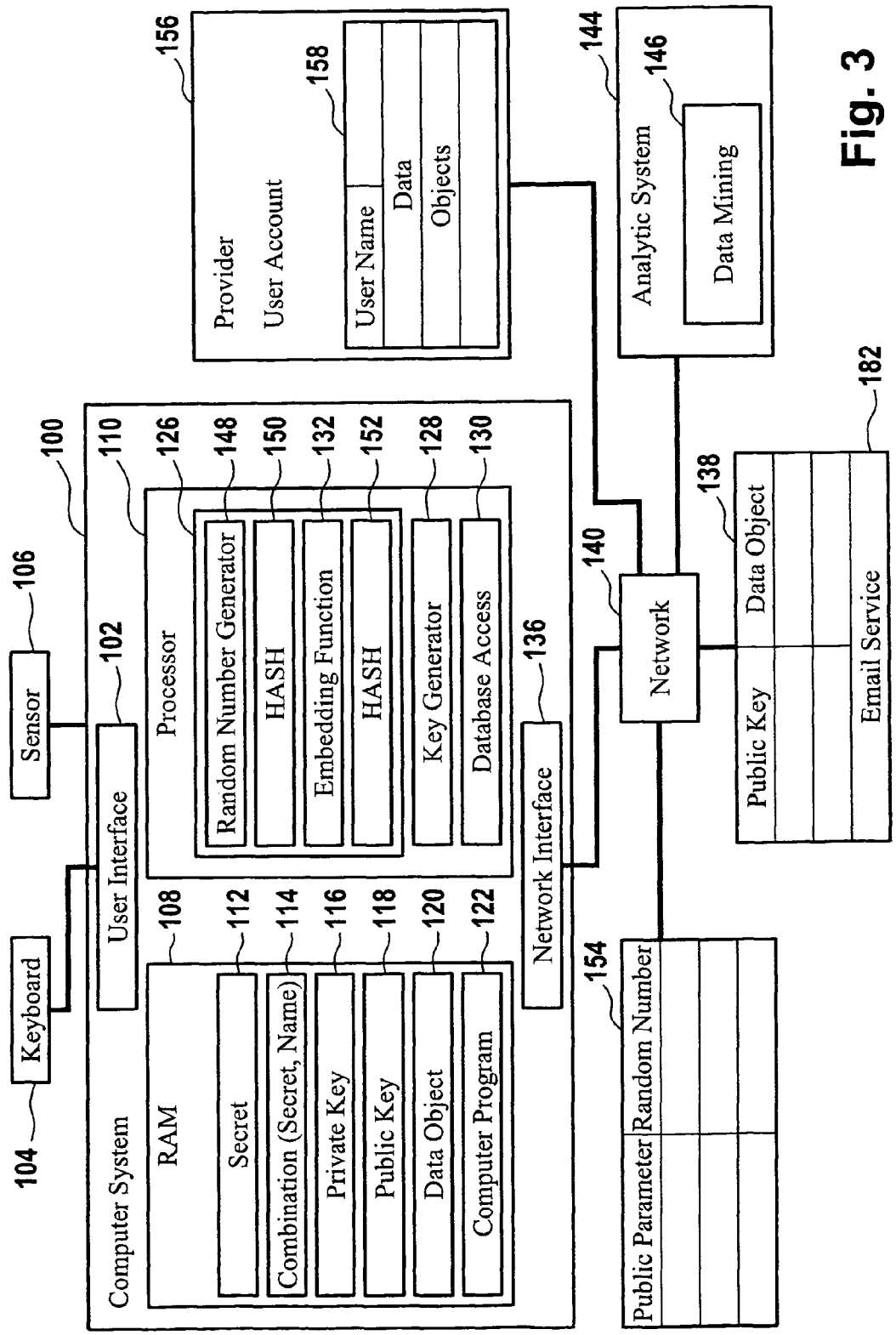
Figure 4:
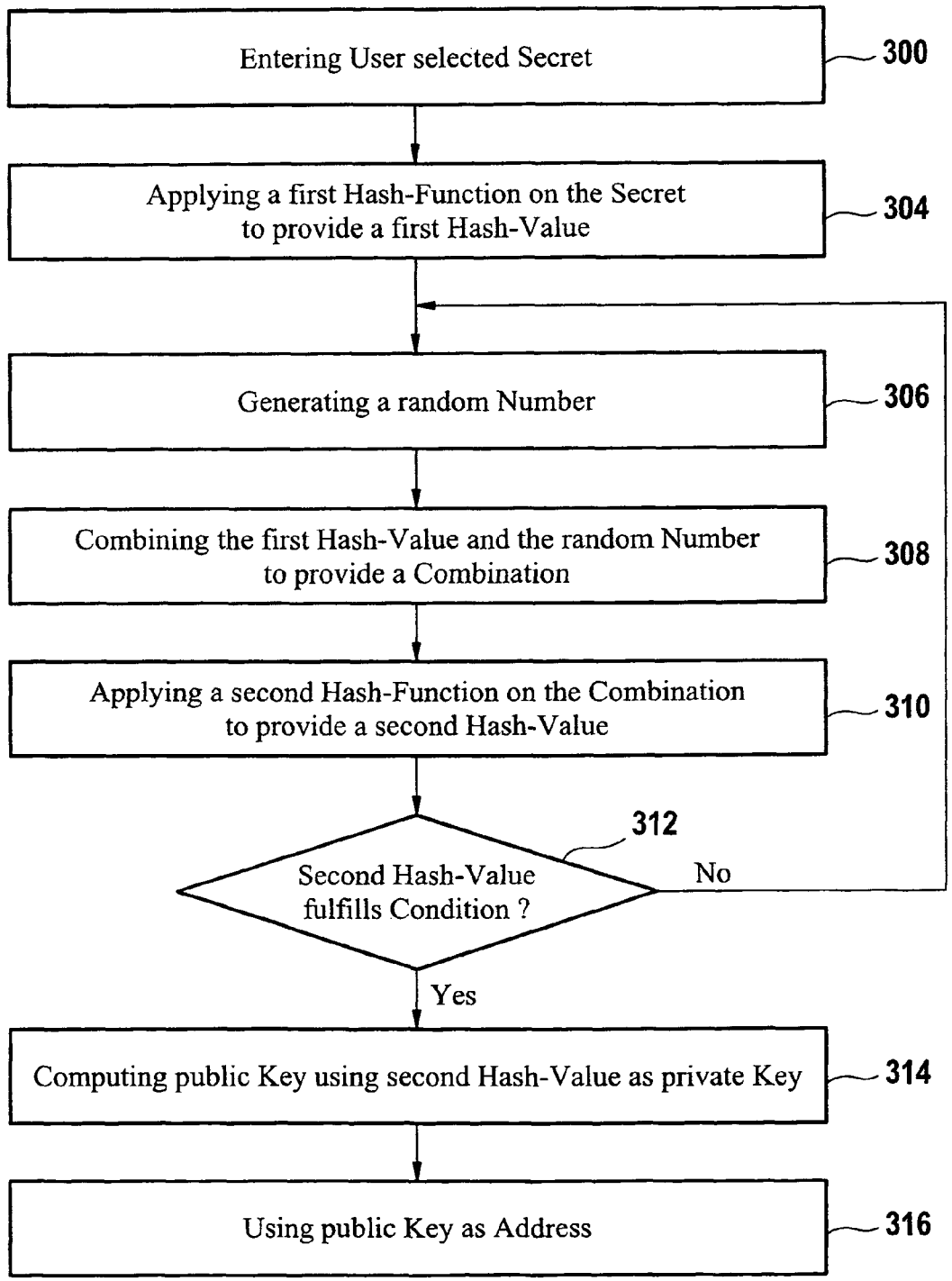
Figure 5:
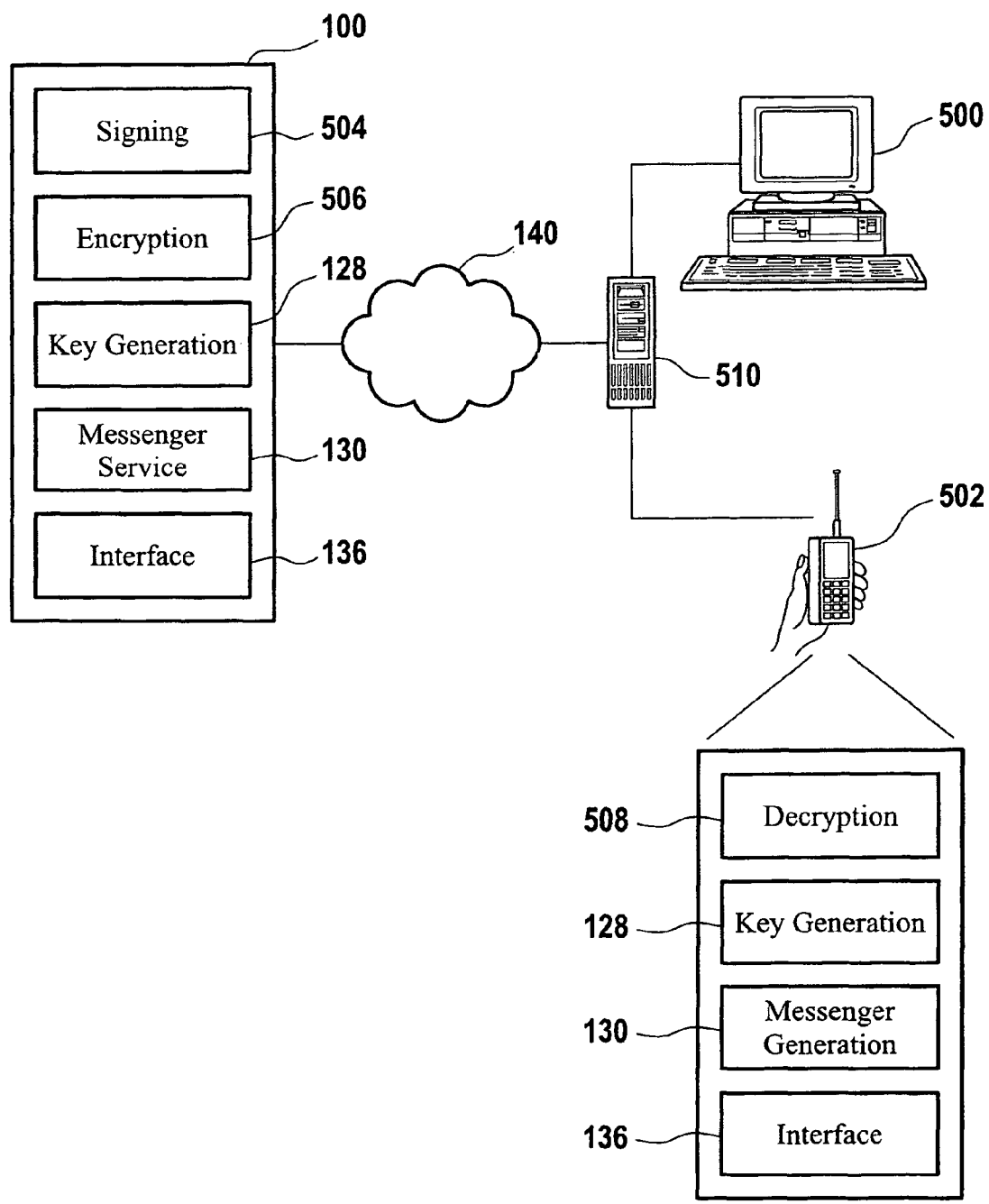

In the following embodiments of the invention are explained in greater detail, by way of example only, making reference to the drawings in which:

FIG. 1 is a block diagram of a first embodiment of a computer system of the invention, FIG. 2 is a flowchart being illustrative of an embodiment of a method of the invention, FIG. 3 is a block diagram of a further embodiment of a computer system of the invention, FIG. 4 is a flowchart being illustrative of a further embodiment of a method of the invention, FIG. 5 is a block diagram of a further embodiment of computer systems of the invention.

DETAILED DESCRIPTION OF ILLUSTRATIVE EMBODIMENTS

Throughout the following detailed description like elements of the various embodiments are designated by identical reference numerals.

FIG. 1 shows a computer system 100 that has a user interface 102 for a user's entry of a user-selected secret 112 that is designated as $s_T$ in the following. For example, a keyboard 104 may be coupled to the computer system 100 for entry of $s_T$. Instead of a keyboard 104 a touch panel or another input device can be coupled to the computer system 100 for entry of $s_T$. In addition, a sensor 106 can be coupled to the computer system 100 such as for capturing biometric data from a biometric feature of the user. For example, the sensor 106 may be implemented as a fingerprint sensor in order to provide biometric fingerprint data to the computer system 100.

A public parameter, such as the user's name or email address, can also be entered into the computer system 100 via the keyboard 104 or otherwise. For example, a personal set $V_{T,i}$ containing at least one user-specific public parameter, such as the user's name or email address, is entered into the computer system 100 by the user $T_i$. Again, it has to be noted that the public parameter is understood as a parameter which is known to the user because the user employs this parameter in his daily life. However, the public, i.e. other people, should not know that the user uses specific public parameters for generating cryptographic keys.

The computer system 100 has a memory 108, such as a random access memory, and at least one processor 110. The memory 108 serves for temporary storage of the user-selected secret $s_T$ 112, a combination 114 of $s_T$ 112 and $V_{T,i}$, a private key 116, a public key 118 and a data object 120, such as a medical data object containing medical data related to the user $T_i$. Further, the memory 108 serves for loading computer program instructions 122 for execution by the processor 110.

The computer program instructions 122 provide an embedding and randomizing function 126, a key generator 128 and may also provide an email service application 130 when executed by the processor 110.

The embedding and randomizing function 126 may be provided as a single program module or it may be implemented by a separate embedding function 132 and a separate randomizing function 134. For example, the embedding function 132 or an embedding component of the embedding and randomization function 126 provides the combination 114 by concatenating $s_T$ and the user's name or by performing a bitwise XOR operation on $s_T$ and the user's name.

In one implementation, the embedding and randomizing function 126 implements symmetric encryption provided by a symmetric cryptographic algorithm, e.g. AES, using a user-specific symmetric key for encryption of the user-selected secret 112. This provides both embedding and randomizing of $s_T$ 112.

In another implementation, the embedding function 132 is implemented by a binary cantor pairing function for embedding $s_T$ 112 and $V_{T,i}$, and the randomizing function 134 is implemented by AES encryption using a symmetric key that is the same for the entire set of users T.

In still another embodiment the embedding and randomizing function 126 is implemented by two different hash functions and a random number generator (cf. the embodiment of FIGS. 3 and 4).

The key generator 128 serves to compute public key 118 using elliptic curve cryptography (ECC). The private key 116 which is the result of the computations described above is multiplied by a base point given by the domain parameters of an elliptic curve which provides the public key 118. By varying the base point and leaving the other domain parameters of the elliptic curve unchanged multiple public keys can be computed for the user $T_i$ on the basis of the same secret $s_T$.

The computer system 100 may further be connected to a data acquisition system 180 used for acquiring the data object 120 and providing it to the RAM 108. For example, the data object 120 may comprise medical data, where in this case the data acquisition system 180 may be part of a medical laboratory.

The computer system 100 may have a network interface 136 for coupling the computer system 100 to a database 138 via a communication network 140, such as the Internet. An email service function 130 or in a more generalized manner a messaging service function 130 enables to send a message comprising the data object 120 stored in the RAM 108 to the database 138 using the public key 118 as email or in general the message's address and thus at the same time as a database access key, e.g. a primary key or candidate key value that uniquely identifies tuples in a database relation. Since the database also comprises an email or in general messaging service function 182, this service function will be able to receive a message comprising the data object 120 and store the data object 120 as message associated with the public key 118.

Further, an analytic system 144, such as a decision support system (DSS) can be coupled to the database 138 such as via the network 140. The analytic system 144 comprises a component 146 for analyzing the data objects of the users T which are stored in the database 138, such as by data mining or data clustering.

In one application the data objects stored in the database 138 contain medical data of the various users. By analyzing the various data objects using techniques such as data mining and/or data clustering techniques medical knowledge can be obtained. For example, data clustering may reveal that certain user attributes contained in the medical data increase the risk for certain diseases. The analytic system 144 may send these results to the according users of the computer system 100 using the messaging system described above.

For generating a public key $p_{T,i}$ 118 for a user $T_i$ based on the secret $s_T$ 112 and domain parameters $D_i$ containing a base point for the elliptic curve cryptography the following steps are executed by the computer system 100 in operation:

The user $T_i$ enters his or her user-selected secret $s_T$ 112 such as via the keyboard 104. In addition, the user may enter at least one public parameter $V_{T,i}$ such as his name or email address via the keyboard 104 or otherwise. Such a public parameter $V_{T,i}$ may also be permanently stored in the computer system 100.

The secret $s_T$ 112 is temporarily stored in memory 108. Upon entry of the secret $s_T$ 112 the embedding function 132 or the embedding component of the embedding and randomizing function 126 generates the combination 114 of the secret $s_T$ 112 and the public parameter $V_{T,i}$. The resultant combination 114 is temporarily stored in the memory 108.

Next, the randomizing function 134 or the randomizing component of the embedding and randomizing function 126 is invoked in order to calculate the private key 116 on the basis of the combination 114. The resultant private key 116 is temporarily stored in memory 108. In the next step, the key generator 128 is started for computing the public key 118 by multiplying the private key 116 by the base point contained in the domain parameters $D_i$ of the elliptic curve being used.

The public key 118, i.e. $p_{T,i}$, is stored in memory 108. The secret $s_T$ 112, the combination 114 as well as the private key 116 as well as any intermediate result obtained by execution of the embedding and randomizing function 126 and the key generator 128 are then erased from the memory 108 and/or the processor 110. As a consequence, there is no technical means to reconstruct the assignment of the resultant public key to the user $T_i$ as only the user knows the secret $s_T$ 112 that has led to the generation of his or her public key $p_{T,i}$. The data object 120 containing sensitive data of the user $T_i$, such as medical data, can then be stored in the database 138 by sending a message comprising the data object 120, the message's address comprising the public key $p_{T,i}$. The message is received by the messaging service 182 of the database 138 and stored in the pseudonymous database 138 using the public key $p_{T,i}$ as a database access key, e.g. a primary key or candidate key value that uniquely identifies tuples in a database relation.

It has to be noted that in the above described embodiment the user $T_i$ sends a message to himself for the purpose of pseudonymous data storage. However, this concept can also be extended to the case in which a user sends a message to another user. In this case, a messaging system's PKI (public key infrastructure) should be employed, which is merely a list of all valid public keys. Otherwise the sender has no opportunity to obtain a recipient's address.

The user-selected secret $s_T$ 112 may be obtained by combining a user-selected password or secret key with biometric data of the user $T_i$ that is captured by the sensor 106. For example, a hash value of the user-selected password or secret key is calculated by execution of respective program instructions by the processor 110. In this instance the hash value provides the user-selected secret $s_T$ 112 on which the following calculations are based.

A plurality of users from the public set of enrolled participants T may use the computer system 100 to generate respective public keys $p_{T,i}$ and to send data objects containing sensitive data, such as medical information by messages to the database 138 as it has been described above in detail for one of the users $T_i$ by way of example. It has to be reminded again, that the email services 130 and 182 are only exemplary services. Any other kind of messaging services may also be employed, as discussed above.

Independent on how a user may have received data objects in the database 138, i.e. either by sending messages to himself or by message reception from other users, for reading one of his own data objects from the database 138, the user $T_i$ has to enter his secret $s_T$ 112. Alternatively, the user has to enter the user-selected password or secret key via the keyboard 104 and an acquisition of the biometric data is performed using the sensor for computation of a hash value that constitutes $s_T$ 112. As a further alternative, the secret key is read by the computer system from an integrated circuit chip card of the user. On the basis of $s_T$ 112 the public key can be computed by the computer system 100.

The public key is then used for performing a database read access on the database 138 in order to read one or more data objects 120 that are stored in the database 138 for that user $T_i$. After the database access operation has been performed the secret $s_T$ 112, the combination 114, the private key 116 and the public key 118 are erased from the computer system 100 as well as any intermediate computational results. In fact, 112, 114, 116 and the intermediate results can be erased directly after the computation of 118.

It has to be noted, that instead of considering the database 138 as a central database with messaging service 182, it may also be possible that the database 138 is a private database of the user $T_i$. In this case, the database 138 may be implemented in a home computer of the user or a database of an email service provider. Thus access to the data object 120 may be performed by the user using his public key, for example generated as discussed above with respect to the computer system 100, via email retrieval protocols like POP3 or IMAP.

FIG. 2 shows a corresponding flowchart for generation of the users' public key.

In step 200 the user $T_i$ enters his or her user-selected secret $s_T$ and public parameter $V_{T,i}$. In step 202 $s_T$ and $V_{T,i}$ are combined to provide the first combination by the embedding function (cf. embedding function 132 of FIG. 1). Next, the randomizing function (cf. randomizing function 134 of FIG. 1). is applied on $s_T$ and $V_{T,i}$ in step 204 which provides a private key. As an alternative, an embedding and randomizing function is applied on $s_T$ and $V_{T,i}$ which provides the private key.

In step 206 a public key is computed using the private key obtained in step 204 and the public key is used in step 208 as (part of) the messaging address of the user $T_i$. For example the public key may be used as an email address.

FIG. 3 shows a further embodiment of computer system 100. In the embodiment considered here the embedding and randomizing function 126 comprises an embedding function 132, a random number generator 148, a first hash function 150 and a second hash function 152. In the embodiment considered here the computation of the private key 116 based on $s_T$ 112 may be performed as follows:

The first hash function 150 is applied on the user-selected secret $s_T$ 112. This provides a first hash value. Next, a random number is provided by the random number generator 148. The random number and the first hash value are combined by the embedding function 132 to provide the combination 114.

The combination of the first hash value and the random number can be obtained by concatenating the first hash value and the random number or by performing a bitwise XOR operation on the first hash value and the random number by the embedding function 132. The result is a combination on which the second hash function 152 is applied to provide a second hash value. The second hash value is the private key 116 on which the calculation of the public key 118 is based.

Dependent on the implementation it may be necessary to determine whether the second hash value fulfils one or more predefined conditions. Only if such conditions are fulfilled by the second hash value it is possible to use the second hash value as the private key 116 for the following computations. If the second hash value does not fulfill one or more of the predefined conditions a new random number is provided by the random number generator 148 on the basis of which a new second hash value is computed which is again checked against the one or more predefined conditions (cf. the embodiment of FIG. 4).

The random number on the basis of which the private key 116 and thereafter the public key 118 has been computed is stored in a database 154 that is coupled to the computer system 100 via the network 140. The random number may be stored in the database 154 using the public parameter $V_{T,i}$ as the database access key for retrieving the random number for reconstructing the public key at a later point of time.

The user $T_i$ may use the public key provided by the computer system 100 for sending an email or generally a message comprising data to an address comprising the public key or to an address which consists of the public key. The email management may be performed by an email provider 156. For registration the user $T_i$ creates his or her user account 158 by entering the public key 118 as the email address such that the email messages or data entered into the account 158 remain private even though they may be accessed by other persons, like for example governmental authorities. Privacy is retained due to the fact that the assignment of the public key to the user $T_i$ is stored nowhere and cannot be reconstructed by technical means without knowledge of the user-selected secret $s_T$ 112.

Again, it has to be noted that this permits only the user $T_i$ to send information to his messaging account. In case a user $T_1$ wants to send a message to user $T_2$, this requires that user $T_1$ is able to obtain the messaging address of $T_2$. For this purpose, he may access a PKI from which the address may be obtained.

According to an embodiment, access to the PKI may be performed by the user $T_1$ by using a pseudonym of the user $T_2$. It has to be noted, that this pseudonym is not to be contemplated with the pseudonym comprising the public user key. Here, the pseudonym may be any identifier which is associated in a database of the PKI with the user's messaging address. Thus, the user $T_2$ may provide his pseudonym to user $T_1$ which may then access the PKI for retrieval of the respective messaging address of user $T_2$.

For reconstructing the public key the user has to enter his or her user-selected secret $s_T$ 112 into the computer system on the basis of which the first hash value is generated by the hash function 150 and the combination 114 is generated by the embedding function 132 or the embedding component of the embedding and randomizing function 126 using the first hash value and the random number retrieved from the database 154.

Depending on the implementation, the user may also need to enter the user's public parameter $V_{T,i}$. An access to the database 154 is performed using the user's public parameter $V_{T,i}$ as a database access key, e.g. a primary key or candidate key value that uniquely identifies tuples in a database relation, in order to retrieve the random number stored in the database 154.

In other words, the reconstruction of the private key 116 is performed by applying the embedding function 132 on the first hash value obtained from the user-selected secret $s_T$ 112 and the retrieved random number which yields the combination 114. The first hash value is combined with the random number retrieved from the database 154 by the embedding function 132 to provide the combination onto which the second hash function 152 is applied which returns the private key 116, out of which the public key 118, i.e. the message address, can be computed. After the user $T_i$ has recovered his or her public key 118 a database access for reading and/or writing from or to the database 138 may be performed. The database 138 may be for example comprised on a home computer system of the user with email service function 182. Alternatively, the user may log into the email provider system 156 using his or her public key as email address for anonymous email, i.e. data object retrieval.

FIG. 4 shows a respective flowchart for generating a public key $p_{T,i}$ for user $T_i$. In step 300 the user enters the user-selected secret $s_T$. In step 304 a first hash function is applied on the user-selected secret $s_T$ which provides a first hash value. In step 306 a random number is generated and in step 308 an embedding function is applied on the first hash value and the random number to provide a combination of the first hash value and the random number. In other words, the first hash value and the random number are mapped to a 1-dimensional space, e.g. a single number, by the embedding function. The combination can be obtained by concatenating the random number and the first hash value or by performing a bitwise XOR operation on the first hash value and the random number.

In step 310 a second hash function is applied on the combination which provides a second hash value. The second hash value is a candidate for the private key. Depending on the implementation the second hash value may only be usable as a private key if it fulfils one or more predefined conditions. For example, if ECC is used, it is checked whether the second hash value is within the interval between 2 and n−1, where n is the order of the elliptic curve.

Fulfillment of such a predefined condition is checked in step 312. If the condition is not fulfilled, the control returns to step 306. If the condition is fulfilled, then the second hash value qualifies to be used as a private key in step 314 to compute a respective public key providing an asymmetric cryptographic key-pair consisting of the private key and the public key. In step 316 the public key computed in step 314 is used for sending messages with the email address comprising the public key, or accessing an email provider database with the email address comprising the public key.

FIG. 5 is a block diagram of a further embodiment of various computer systems of the invention. For example, the computer system 100 in FIG. 5 may be a mobile telephone with similar functions as discussed above with respect to the computer system 100 in FIG. 1. Thus, the mobile phone 100 comprises a key generation module 128 for generation of a user's public and private key. In case a user desires to send a message to another user, he needs to know the public key of said recipient.

In case said public key is known, a message to be transmitted may thereupon be sent to said recipient by means of the messenger service 130 implemented in the system 100 via the interface 136.

Since the system 100 is a mobile phone, the message will be sent via a telecommunication network 140 to a server 510, from which the message will then be forwarded to the recipient. For example, in case the message is an email message, the message may be sent to the computer system 500 which comprises similar functions as the computer system 100. In case the message is a short message (SMS) or multimedia message (MMS), the message may be transmitted from the server 510 to a further mobile phone 502. Said mobile phone also comprises similar functions as the computer system 100.

For the purpose of enhanced data safety, data in the message may be encrypted. For this purpose, the system 100 comprises a data encryption module which uses the public recipient key for data encryption. Thus, the message sent to the recipient is sent in an encrypted manner. Decryption at the recipient's system, for example the mobile phone 502, may be performed employing the recipient's private key by the decryption module 508. The private key may be generated similarly as discussed above with respect to FIG. 3, reconstruction of the private key 116.

In a further embodiment, the mobile phone 100 may comprise a data signature module 504 which uses the senders' private key for signing the message to be sent. Again, the senders' private key may be generated similarly as discussed above with respect to FIG. 3, reconstruction of the private key 116.

It has to be noted that it is also possible using any arbitrary kind of pseudonym and to associate said pseudonym to an asymmetric cryptographic key pair. Thus, the messaging address can also be a pseudonym or a pseudonym can be associated to the messaging address.

MATHEMATICAL APPENDIX

1. Embedding Functions

There exist n-ary scalar functions $$d: N \times N \rightarrow N$$

which are infective—and even bijective, where N is the set of natural numbers. The function d( ) embeds uniquely an n-dimensional space, i.e. n-tuples $(k_1, \ldots, k_n)$, into scalars, i.e. natural numbers k.

2. The Binary Cantor Pairing Function

The binary cantor pairing function $\pi$ is an embodiment of embedding function 132. The binary cantor pairing function is defined as follows:

$$\pi: \mathbb{N} \times \mathbb{N} \rightarrow \mathbb{N}$$

$$\pi(m, n) = \frac{1}{2}(m+n)(m+n+1) + n$$

which assigns to each fraction m/n the unique natural number π(m, n)—thus demonstrating that there are no more fractions than integers. Hence, if we map both $s_T$ and $V_{T,i}$ to natural numbers and use the fact that all identities are distinct then $\pi(s_T, V_{T,i})$ yields a unique value for each identity, even if there are equal personal secrets. To be more precise, since this function does not distinguish between e.g. ½, ²⁄₄ etc, it assigns to each fraction an infinite number of unique natural numbers.

3. Elliptic Curve Cryptography (ECC)

Let:
p be a prime number, p>3, and $\mathbb{F}_p$ the corresponding finite field
a and b integers
Then the set E of points (x, y) such that $$E=\{(x,y)\in\mathbb{F}_p\times\mathbb{F}_p | y^2=x^3+ax+b\} \quad (F1)$$

defines an elliptic curve in $\mathbb{F}_p$. (For reasons of simplicity, we skip the details on E being non-singular and, as well, we do not consider the formulae of elliptic curves over finite fields with p=2 and p=3. The subsequent statements apply to these curves, too.)

The number m of points on E is its order.
Let P,Q∈E be two points on E. Then the addition of points $$P+Q=R \text{ and } R\in E \quad (F2)$$

can be defined in such a way that E forms an Abelian group, viz, it satisfies the rules of ordinary addition of integers. By writing $$P+P=[2]P$$

We define the k-times addition of P as [k]P, the point multiplication.

Now EC-DLP, the elliptic curve discretionary logarithm problem, states that if $$Q=[k]P \quad (F3)$$

then with suitably chosen a, b, p and P, which are known to public, and the as well known to the public point Q it is computationally infeasible to determine the integer k.

The order n of a point P is the order of the subgroup generated by P, i.e. the number of elements in the set $$\{P,[2]P,\ldots,[n]P\} \quad (F4)$$

With all this in mind we define an elliptic curve cryptographic (ECC) system as follows. Let:
E be an elliptic curve of order m
B∈E a point of E of order n, the base point
Then $$D=\{a,b,p,B,n,co(B)\} \quad (F5)$$

with co $$(B)=\frac{m}{n}$$

defines a set of domain ECC-parameters. Let now g be an integer and $$Q=[g]B \quad (F6)$$

Then (g, Q) is an ECC-key-pair with g being the private key and Q the public key.

For we rely on findings of Technical Guideline TR-03111, Version 1.11, issued by the Bundesamt für Sicherheit in der Informationstechnik (BSI), one of the best accredited source for cryptographically strong elliptic curves, we can take that m=n, i.e. co(B)=1, and hence reduce (F5) to $$D=\{a,b,p,B,n\} \quad (F7)$$

Now we can define our one-way function. Let D be a set of domain parameters concordant with (F7). Then $$f: [2,n-1] \to E$$
$$k \mapsto [k]B \quad (F8)$$

i.e. the point multiplication (F6), is an infective one-way function.

4. Implementing Key Generator Based on ECC

The key generator 128 (cf. FIGS. 1 and 3) can be implemented using ECC.

Definitions:
There are public sets of ECC-domain parameters $D_1$, $D_2$, ... concordant with (F7)

$$D_i=\{a_i,b_i,p_i,B_i,n_i\} \quad (F9)$$

There are public functions: an embedding function d( ) a randomizing function r( ) and our one-way function f( ) defined by (F8).
There is a public set of enrolled participants (users)

$$T=\{T_1,T_2,\ldots\} \quad (F10)$$

Note that a $T_i$ does not Necessarily Possess any personally identifying details, i.e. we assume that T resembles the list of participants in an anonymous Internet-community, in which each participant can select his name at his discretion as long as it is unique.

Each participant T∈T chooses at his complete discretion his personal secret $s_T$. In particular, for this secret is never revealed to anybody else—it is the participant's responsibility to ensure this—it is not subject to any mandatory conditions, such as uniqueness.

Our public key derivation function is $$h(\ )=f(r(d(\ ))) \quad (F11)$$

with the following properties:
Given a T∈T with his $s_T$, a $D_i$ and T, $D_i\Delta V_{T,i}$ $$r(d(s_T,V_{T,i}))=g_{T,i} \quad (F12)$$

where $g_{T,i}$ is a unique and strong, i.e. sufficiently random, private ECC-key for $D_i$.

The public key $p_{T,i}$ corresponding to T, $s_T$ and $D_i$ is $$p_{T,i}=f(g_{T,i},D_i)=[g_{T,i}]B_i=(x_{T,i},y_{T,i}) \quad (F13)$$

There is a public set of public keys $$P=\{p_1,p_2,\ldots\} \quad (F14)$$

such that P comprises one or more public keys for each participant in T computed according to (F11). This wording implies that here is no recorded correspondence between a participant in T and his public keys in P, i.e. each $p_{T,i}$ is inserted in an anonymous way as $p_k$ into P.

Remarks:
The use of multiple domain parameters enables us to endow a single participant with a single personal secret with multiple public keys. This in turn enables a participant to be a member of multiple public key groups such that data of these groups cannot—for, e.g. personal or legal reasons—be correlated. Therefore, attempts to exploit combined public keyous profiles for unintended, possibly malicious purposes, are of no avail.

The distinction between two sets of domain parameters $D_i$ and $D_j$ can be minor. In accordance with our principle to use only accredited domain parameters, e.g. those listed in BSI TR-03111, we can set $$D_i = \{a, b, p, B, n\} \quad (F15)$$

by swapping B for a statistically independent $B_2$, i.e. by choosing a different base point, we can set $$D_j = \{a, b, p, B_2, n\} \quad (F16)$$

For $D_i$ and $D_j$ refer to the same elliptic curve we can have only one function (F12) and introduce the crucial distinction with (F13). This vastly simplifies concrete implementations—we select a suitable curve and vary the base points only.

LIST OF REFERENCE NUMERALS

100 Computer system
102 User interface
104 Keyboard
106 Sensor
108 Memory
110 Processor
112 A user-selected secret
114 Combination
116 Private key
118 Public key
120 Data object
122 Computer program instructions
126 Embedding and randomizing function
128 Key generator
130 Email service function
132 Embedding function
134 Randomizing function
136 Network interface
138 Database
140 Network
144 Analytic system
146 Data Analysis Component
148 Random number generator
150 Hash function
152 Hash function
154 Database
156 Email Provider
158 User profile
180 Data acquisition system
182 Email service function
500 Computer system
502 Mobile phone
504 Data signing module
506 Data encryption module
508 Data decryption module

What is claimed is:

1. A computer implemented method for sending a message to a recipient user, the method comprising the following steps performed by a processor:
generating a public key and a private key, the public key and private key forming an asymmetric cryptographic key pair, via the following steps:
receiving a user-selected secret,
storing the user-selected secret in memory associated with the processor,
computing the private key by applying a function to the user-selected secret,
storing the private key in memory,
computing the public key using the private key,
generating a recipient address of a user based upon the public key, comprising using the public key as the recipient address or as a portion of the recipient address, and
sending the message to the user using the recipient address.

2. The method of claim 1, wherein said message is sent encrypted with the public key to the user.

3. The method of claim 1, wherein said message is sent from a sender user, wherein a sender asymmetric cryptographic key pair is associated with the sender user, said key pair comprising a public sender key and a private sender key, the method further comprising the steps of
generating a signature of the message using the private sender key, and
sending the signature to said user as well as the sender's public key for signature verification.

4. The method of claim 1, wherein the message is a synchronous or asynchronous conferencing message.

5. The method of claim 4, wherein the message is an email message with the message being sent to the user by email, wherein the email address comprises the public key.

6. The method of claim 1, wherein the computation of the public key is performed by elliptic curve cryptography (ECC).

7. The method of claim 5, further comprising registering the public key as an email address of the user.

8. The method of claim 7, further comprising:
registering the public key in a public key infrastructure (PKI) under a pseudonym of the user,
providing the pseudonym to another party, and
obtaining the public key from the PKI by the other party by use of the pseudonym, wherein the sending comprises emailing the message by the other party to the user using the public key as the recipient address.

9. The method of claim 1, further comprising:
storing data of the user in a publicly accessible database in an unencrypted form, and
retrieving the data from the publicly accessible database using the public key as a database access key.

10. The method of claim 1, whereby the identity of the user is not revealed when sending the message to the user.

11. The method of claim 1, wherein the applying comprises applying an embedding and randomizing function to the user-selected secret.

12. The method of claim 11, wherein the applying the embedding and randomizing function comprises:
applying a first one-way function to the user-selected secret to provide a first value,
providing a random number,
embedding the random number and the first value by combining them to provide a combination, and
applying a second one-way function to the combination to provide a second value, wherein the second value constitutes the private key.

13. The method of claim 12, wherein at least one of the first one-way function and the second one-way function comprises point multiplication along an elliptic curve.

14. The method of claim 11, further comprising:
storing a parameter to represent a random number generated by the embedding and randomizing function; and
using the parameter to regenerate the public key.

15. The method of claim 1, wherein the sending comprises sending the message unencrypted.

16. The method of claim 1, further comprising erasing the user-selected secret and the private key from the memory directly after computing the public key.

17. A computer system for sending a message to a recipient user, the system comprising:
one or more input devices for entering a user-selected secret, memory for storing the user-selected secret and a private key, a recipient asymmetric cryptographic key pair which is associated with the recipient user, said key pair comprising a public key and the private key, a processing unit that:
  computes the private key by applying a function to the user-selected secret,
  computes the public key using the private key,
  generates a recipient address of the recipient user based upon the public key, comprising using the public key as the recipient address or as a portion of the recipient address, an interface that sends the message to said recipient user using the recipient address, a first messaging service that sends messages, and a second messaging service that receives messages sent by the first messaging service.

18. A computer program product comprising a non-transitory computer-readable medium comprising computer-executable instructions that when executed cause a processor to:
  generate a public key and a private key, the public key and private key forming an asymmetric cryptographic key pair, via the following steps:
    receive a user-selected secret,
    store the user-selected secret in memory associated with the processor,
    compute the private key by applying a function to the user-selected secret,
    store the private key in memory,
    compute the public key using the private key,
    generate a recipient address of a user based upon the public key, comprising using the public key as the recipient address or as a portion of the recipient address, and
  send the message to the user using the recipient address.

19. The computer program product of claim 18, wherein the instructions further comprise instructions to register the public key as an email address of the user.

20. The computer program product of claim 18, wherein the instructions further comprise instructions to:
  store data of the user in a publicly accessible database in an unencrypted form, and
  retrieve the data from the publicly accessible database using the public key as a database access key.

\* \* \* \* \*